US012695621B2

(12) United States Patent
Kusaka

(10) Patent No.: US 12,695,621 B2
(45) Date of Patent: Jul. 28, 2026

(54) MEMORY SYSTEM

(71) Applicant: Kioxia Corporation, Tokyo (JP)

(72) Inventor: Masahiro Kusaka, Kawasaki (JP)

(73) Assignee: KIOXIA CORPORATION, Tokyo (JP)

( * ) Notice: Subject to any disclaimer, the term of this patent is extended or adjusted under 35 U.S.C. 154(b) by 186 days.

(21) Appl. No.: 18/795,461

(22) Filed: Aug. 6, 2024

(65) Prior Publication Data

US 2025/0055702 A1 Feb. 13, 2025

(30) Foreign Application Priority Data

Aug. 9, 2023 (JP) ................................. 2023-130441

(51) Int. Cl.
H04L 9/32 (2006.01)
H04L 9/14 (2006.01)
(52) U.S. Cl.
CPC .............. H04L 9/3247 (2013.01); H04L 9/14 (2013.01)
(58) Field of Classification Search
None
See application file for complete search history.

(56) References Cited

U.S. PATENT DOCUMENTS

| | | | |
|---|---|---|---|
| 9,419,804 B2 | 8/2016 | Watanabe et al. | |
| 2009/0016534 A1* | 1/2009 | Ortiz Cornet | ........... G06F 21/64 |
| | | | 380/277 |

| | | | |
|---|---|---|---|
| 2012/0324229 A1* | 12/2012 | Buldas | .................. H04L 9/3247 |
| | | | 713/176 |
| 2018/0343109 A1 | 11/2018 | Koseki et al. | |
| 2020/0014542 A1* | 1/2020 | McIver | ............... H04L 63/1425 |

FOREIGN PATENT DOCUMENTS

| | | |
|---|---|---|
| JP | 5045489 B2 | 10/2012 |
| JP | 5989183 B2 | 9/2016 |
| JP | 6266186 B2 | 1/2018 |
| WO | WO-2013/153628 A1 | 10/2013 |

OTHER PUBLICATIONS

@uchina "Implement aggregate signatures (BGLS signatures) using the pairing library mcl", Qiita Inc., Mar. 30, 2022; URL: https://qiita.com/uchina/items/964e010b3a1528a06eaf.

(Continued)

*Primary Examiner* — Atta Khan
(74) *Attorney, Agent, or Firm* — FOLEY & LARDNER LLP

(57) ABSTRACT

A memory system includes a first storage; a second storage storing log information indicating a history of accesses to the first storage; a third storage storing a first private key and a first public key; and a processor configured to convert the log information into a first hash value by inputting the log information into a hash function, sign the first hash value using the first private key, and generate a first signature. The processor is further configured to convert the log information read from the second storage into a second hash value by inputting the log information into the hash function; and perform signature verification using the first public key paired with the first private key and the second hash value.

2 Claims, 9 Drawing Sheets

(56) References Cited

OTHER PUBLICATIONS

A. Bagherzandi et al., "Multisignatures Secure under the Discrete Logarithm Assumption and a Generalized Forking Lemma" CCS '08: Proceedings of the 15th ACM conference on Computer and communications security, Oct. 2008, pp. 449-458; DOI: https://doi.org/10.1145/1455770.1455827.

A. L. Ferrara, et al., "Practical Short Signature Batch Verification", Conference: Proceedings of the The Cryptographers' Track at the RSA Conference 2009 on Topics in Cryptology, pp. 309-324, Springer, Berlin, Heidelberg; DOI:10.1007/978-3-642-00862-7_21.

D. Boneh et al., "Aggregate and Verifiably Encrypted Signatures from Bilinear Maps", Conference: Proceedings of the 22nd international conference on Theory and applications of cryptographic techniques, Lecture Notes in Computer Science, vol. 2656, pp. 416-432, Springer, Berlin, Heidelberg; DOI: https://doi.org/10.1007/3-540-39200-9_26.

Dash "BLS: Is it really that slow?" Jul. 6, 2018; URL: https://www.dash.org/blog/bls-is-it-really-that-slow/.

Interview with Professor Tsutomu Matsumoto, Graduate School of Environmental Information Studies, Yokohama National University, "New functional encryption functions required for the next generation IT society and their performance evaluation (Part 2)" SECOM Science and Technology Foundation; URL: https://www.secomzaidan.jp/interview/matsumoto-t5.html.

Patriot "Performance comparison between ECDSA and BLS signature schemes" Stack Exchange Inc, edited May 3, 2022; URL: https://crypto.stackexchange.com/questions/39663/performance-comparison-between-ecdsa-and-bls-signature-schemes.

Torao Takami, "Performance Comparison of Cryptographic Primitives" Hazardous Materials, Jul. 14, 2021; URL:https://hazm.at/mox/security/performance-comparisons/index.html.

* cited by examiner

21

3

20

MAIN
STORAGE

25

HOST

INTER-
FACE
CIRCUIT

24(BUS)

CPU

OTP
MEMORY

22

23

MEMORY SYSTEM

2

1 (INFORMATION PROCESSING SYSTEM)

*FIG. 2*

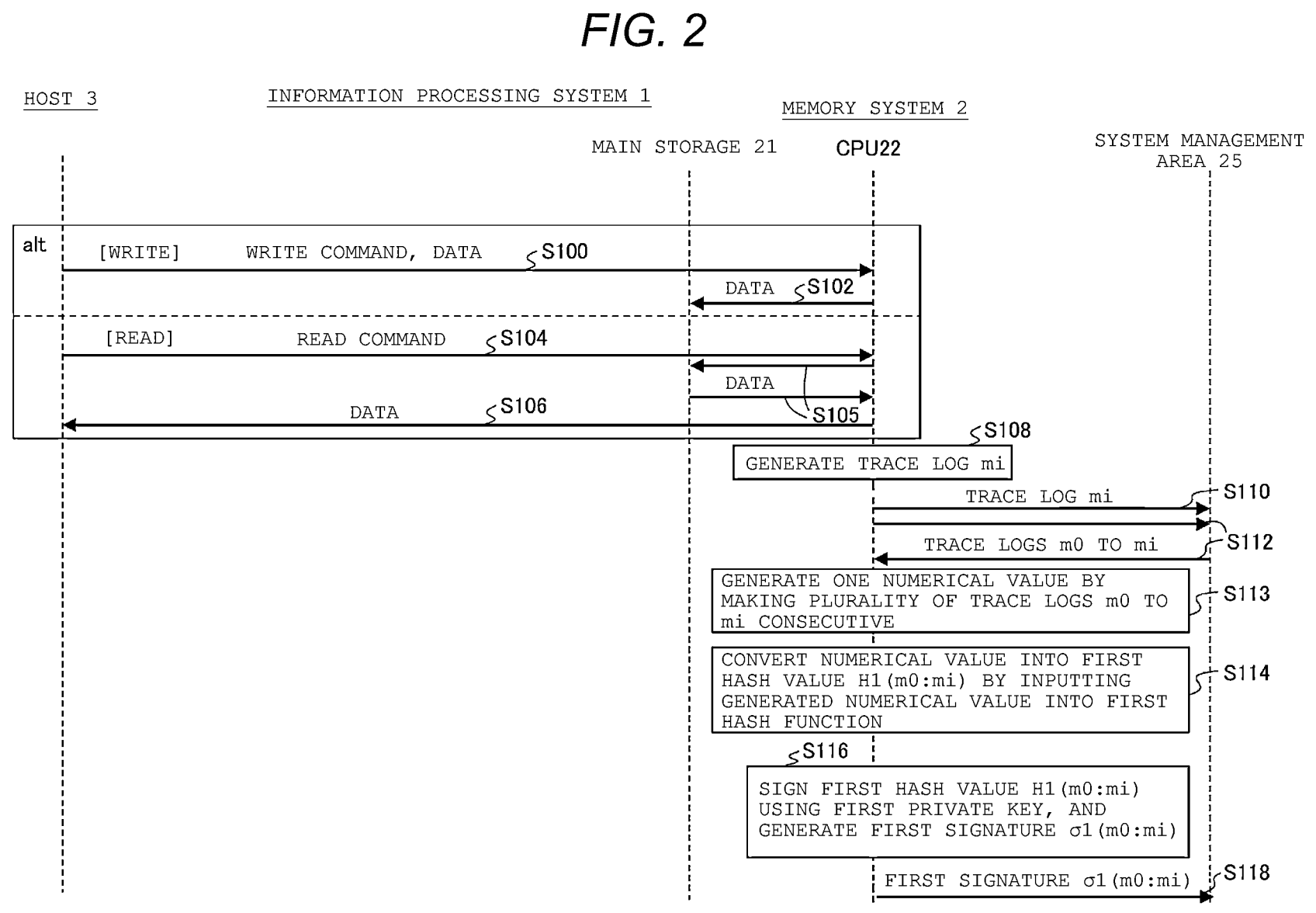

INFORMATION PROCESSING SYSTEM 1

HOST 3     MAIN STORAGE 21     CPU22     MEMORY SYSTEM 2     SYSTEM MANAGEMENT AREA 25 alt

[WRITE]   WRITE COMMAND, DATA   S100

DATA   S102

[READ]   READ COMMAND   S104

DATA   S105

DATA   S106

GENERATE TRACE LOG mi   S108

TRACE LOG mi   S110

TRACE LOGS m0 TO mi   S112

GENERATE ONE NUMERICAL VALUE BY MAKING PLURALITY OF TRACE LOGS m0 TO mi CONSECUTIVE   S113

CONVERT NUMERICAL VALUE INTO FIRST HASH VALUE H1 (m0:mi) BY INPUTTING GENERATED NUMERICAL VALUE INTO FIRST HASH FUNCTION   S114

SIGN FIRST HASH VALUE H1 (m0:mi) USING FIRST PRIVATE KEY, AND GENERATE FIRST SIGNATURE σ1 (m0:mi)   S116

FIRST SIGNATURE σ1 (m0:mi)   S118

*FIG. 3*

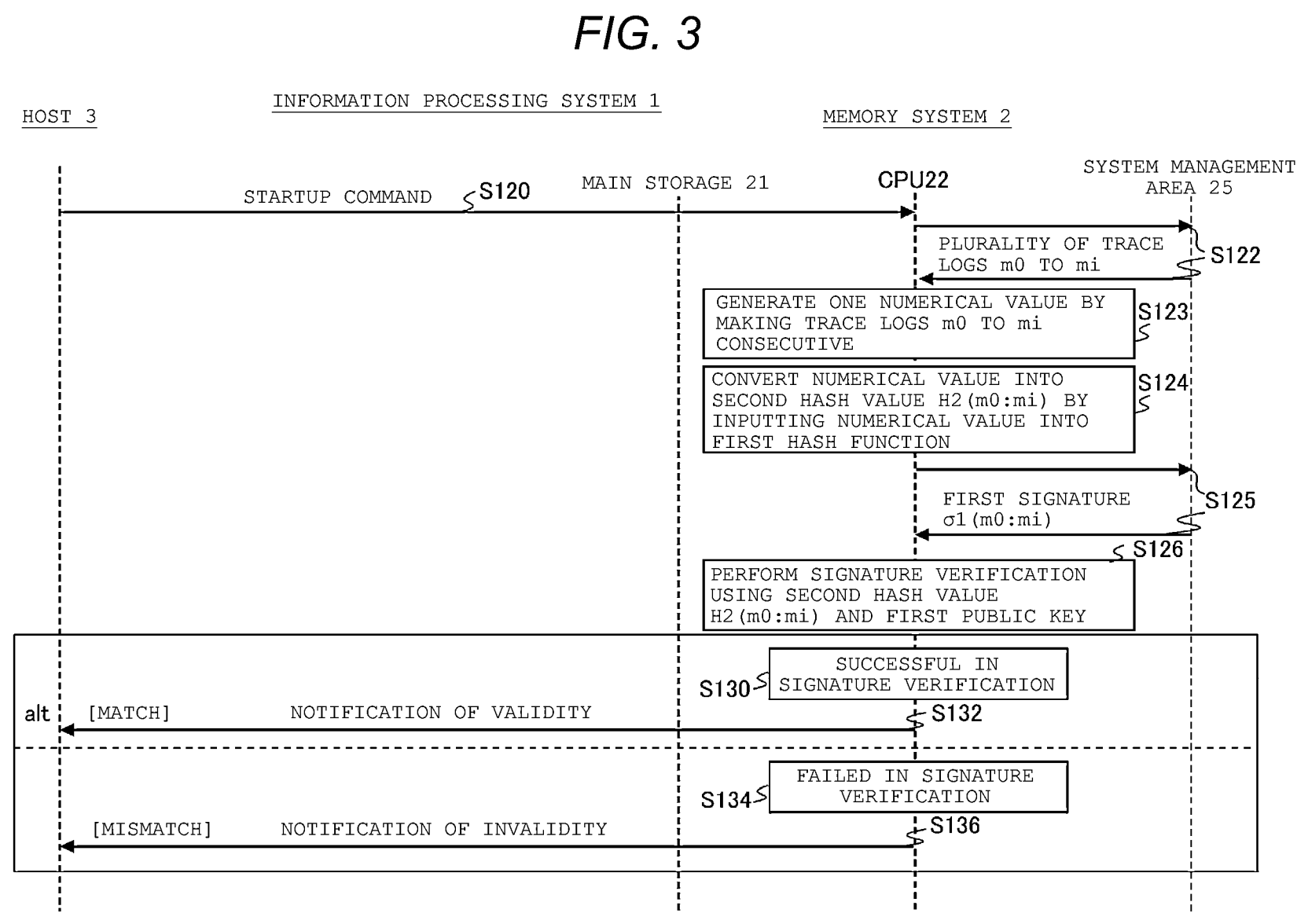

INFORMATION PROCESSING SYSTEM 1    MEMORY SYSTEM 2

HOST 3    MAIN STORAGE 21    CPU22    SYSTEM MANAGEMENT AREA 25

STARTUP COMMAND    S120

PLURALITY OF TRACE LOGS m0 TO mi    S122

GENERATE ONE NUMERICAL VALUE BY MAKING TRACE LOGS m0 TO mi CONSECUTIVE    S123

CONVERT NUMERICAL VALUE INTO SECOND HASH VALUE $H2(m0:mi)$ BY INPUTTING NUMERICAL VALUE INTO FIRST HASH FUNCTION    S124

FIRST SIGNATURE $\sigma1(m0:mi)$    S125

PERFORM SIGNATURE VERIFICATION USING SECOND HASH VALUE $H2(m0:mi)$ AND FIRST PUBLIC KEY    S126 alt

[MATCH]    SUCCESSFUL IN SIGNATURE VERIFICATION    S130

NOTIFICATION OF VALIDITY    S132

[MISMATCH]    FAILED IN SIGNATURE VERIFICATION    S134

NOTIFICATION OF INVALIDITY    S136

*FIG. 4*

INFORMATION PROCESSING SYSTEM 1

INFORMATION PROCESSING SYSTEM 1

INFORMATION PROCESSING SYSTEM 1

INFORMATION PROCESSING SYSTEM 1

MEMORY SYSTEM

CROSS-REFERENCE TO RELATED APPLICATION

This application is based upon and claims the benefit of priority from Japanese Patent Application No. 2023-130441, filed Aug. 9, 2023, the entire contents of which are incorporated herein by reference.

FIELD

Embodiments described herein relate generally to a memory system.

BACKGROUND

In general, when a memory system is access, recording a trace log and detecting unauthorized access to the memory system from the trace log are performed. However, if the trace log is altered, the unauthorized access cannot be detected.

DESCRIPTION OF THE DRAWINGS

FIG. 2 is a sequence diagram illustrating an example of signature processing of a trace log according to the first embodiment.

FIG. 3 is a sequence diagram illustrating an example of verification processing of the trace log according to the first embodiment.

FIG. 4 is a sequence diagram illustrating an example of signature processing of a trace log according to a second embodiment.

DETAILED DESCRIPTION

Figure 1:
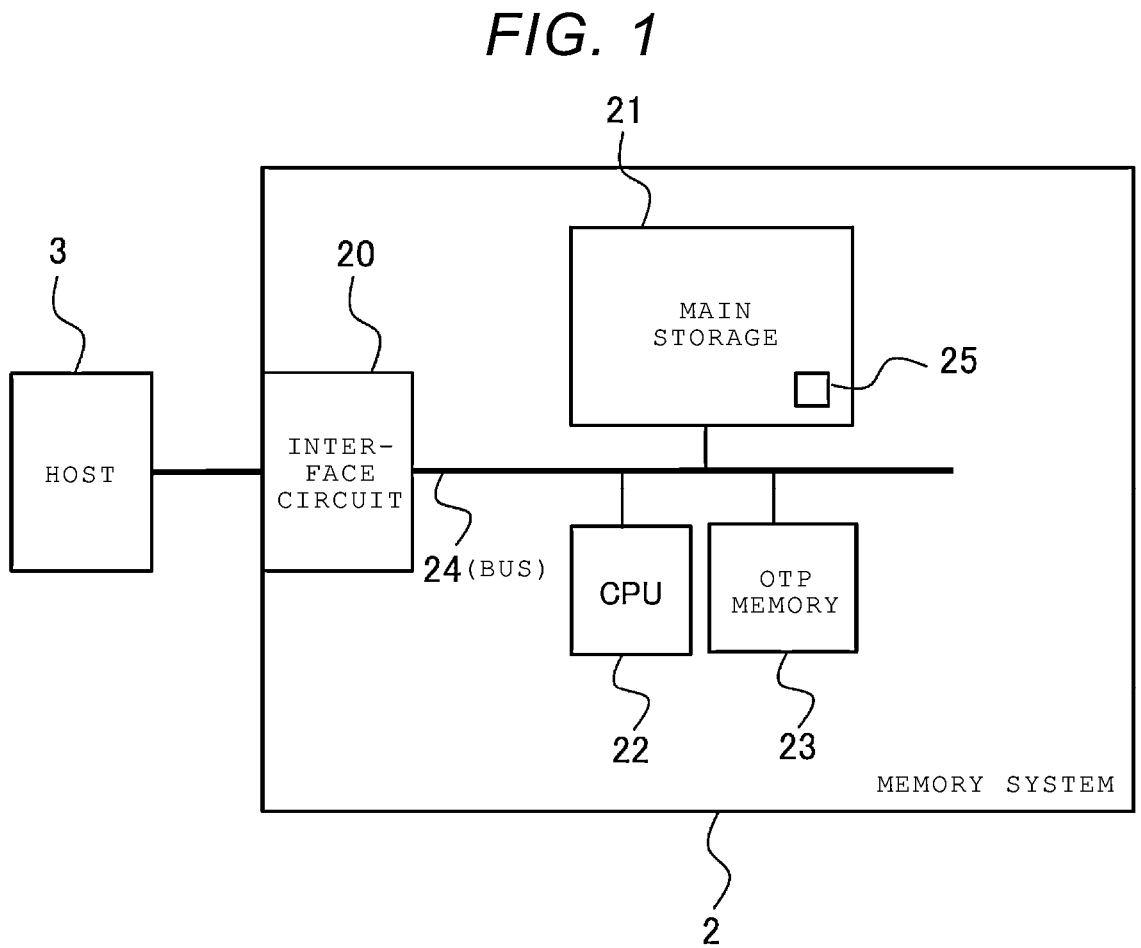
FIG. 1 is a block diagram illustrating a configuration example of an information processing system according to a first embodiment.

Embodiments provide a memory system that can detect unauthorized access.

In general, according to one embodiment, a memory system is disclosed. The memory system includes a first storage; a second storage storing log information indicating a history of accesses to the first storage; a third storage storing a first private key and a first public key; and a processor configured to convert the log information into a first hash value by inputting the log information into a hash function, sign the first hash value using the first private key, and generate a first signature. The processor is further configured to convert the log information read from the second storage into a second hash value by inputting the log information into the hash function; and perform signature verification using the first public key paired with the first private key and the second hash value.

Embodiments of the present disclosure will be described below with reference to the drawings. In the specification and drawings, the same elements are given the same reference numerals.

First Embodiment

FIG. 1 is a block diagram illustrating a configuration example of an information processing system 1 according to the first embodiment.

The information processing system 1 includes a memory system 2 and a host 3. The memory system 2 and the host 3 are communicably connected to each other.

The memory system 2 is a storage device. The memory system 2 is, for example, a solid state drive (SSD) or a hard disk drive (HDD). The memory system 2 is configured with a single semiconductor chip. Alternatively, the memory system 2 is configured with a module obtained by combining a plurality of semiconductor chips.

The host 3 is an information processing apparatus external to the memory system 2. The host 3 is, for example, a server or a personal computer (PC). The host 3 is connected to the memory system 2. The host 3 transmits a read command to the memory system 2 when reading data from the memory system 2. The host 3 transmits a write command when writing data to the memory system 2. Furthermore, the host 3 transmits a startup command to the memory system 2 when the information processing system 1 is started up.

The memory system 2 includes an interface circuit 20, a main storage 21, a central processing unit (CPU) 22, a one time programmable (OTP) memory 23, a bus 24, and a system management area 25.

The interface circuit 20 is a physical interface. The interface circuit 20 receives data from the outside. The interface circuit 20 also transmits data to the outside.

The main storage 21 is a nonvolatile memory. The main storage 21 is, for example, a NAND flash memory. The main storage 21 stores data received by the interface circuit 20. The system management area 25 is provided in the main storage 21. The system management area 25 is an area for storing a trace log, a hash function, and a key derive function (KDF). The system management area 25 stores the trace log, the hash function and the KDF. The hash function is a function that hashes the trace log and converts the trace log into a hash value. The system management area 25 may be provided as a part of the main storage 21, or may be connected to the bus 24 as a nonvolatile storage device (not illustrated) provided separately from the main storage 21.

The CPU 22 is an operation processing unit (or processor). The CPU 22 converts the trace log into the hash value by inputting the trace log into the hash function. The CPU 22 signs the converted hash value using a private key of an encryption key stored in the OTP memory 23. The private key of the encryption key is a value stored in the OTP memory 23, or a value obtained by inputting the value stored in the OTP memory 23 into the KDF. Furthermore, when the information processing system 1 is started up, the CPU 22 verifies the generated signature using a public key of the encryption key. The trace log is log information indicating a history of accesses from the host 3 to the main storage 21. The trace log is information including, for example, a command received from the host 3 and the time when the main storage 21 was accessed from the host 3. The signature is, for example, an electronic signature based on the Rivest-Shamir-Adleman (RSA) scheme or the Elliptic Curve Digital Signature Algorithm (ECDSA) scheme.

The OTP memory 23 is a memory that cannot be rewritten after being written to only once. The OTP memory 23 is, for example, a read only memory (ROM) such as a fuse. The OTP memory 23 stores the encryption key.

The encryption key encrypts the hash value and converts the hash value into a signature.

The bus 24 is a wiring that connects the interface circuit 20, main storage 21, CPU 22, and OTP memory 23 so as to be communicable with each other.

FIG. 2 is a sequence diagram illustrating an example of signature processing of the trace log according to the first embodiment.

When the host 3 writes data to the memory system 2 ([write]), the host 3 transmits a write command and data to the memory system 2 (S100).

The CPU 22 of the memory system 2 stores the received data in the main storage 21 based on the received write command (S102).

When the host 3 reads data from the memory system 2 ([read]), the host 3 transmits a read command to the memory system 2 (S104).

The CPU 22 of the memory system 2 reads data from the main storage 21 based on the received read command (S105).

The CPU 22 of the memory system 2 transmits the read data to the host 3 (S106).

The CPU 22 of the memory system 2 generates a trace log mi (i is a positive integer) for the received write command and read command (S108).

The CPU 22 stores the generated trace log mi in the system management area 25 (S110).

The CPU 22 reads a plurality of trace logs m0 to mi stored in the system management area 25 (S112). The plurality of trace logs m0 to mi are, for example, a history of past accesses to the main storage 21.

The CPU 22 generates one numerical value (first value) by making a plurality of read trace logs m0 to mi consecutive (S113). The CPU 22 converts the first value into a first hash value H1(m0:mi) by inputting the generated first value into a first hash function (S114).

The CPU 22 signs the first hash value H1(m0:mi) using the first private key from the OTP memory 23, and generates a first signature σ1(m0:mi) (S116). The CPU 22 stores the first signature σ1(m0: mi) in the system management area 25 (S118), and ends the series of processing illustrated in FIG. 2. A first encryption key includes the first private key and the first public key that form a pair. The first private key is a key used when generating the signature. The first public key is a key used when verifying the signature generated by signing with the first private key.

FIG. 3 is a sequence diagram illustrating an example of verification processing of the trace log according to the first embodiment.

In boot processing when starting up the information processing system 1, the host 3 transmits a startup command to the memory system 2 (S120).

When the CPU 22 of the memory system 2 receives the startup command, the CPU 22 reads the plurality of trace logs m0 to mi stored in the system management area 25 (S122).

The CPU 22 generates one numerical value (second value) by making the plurality of read trace logs m0 to mi consecutive (S123).

The CPU 22 converts the second value into a second hash value H2(m0: mi) by inputting the generated second value into the first hash function (S124).

The CPU 22 reads the first signature σ1(m0: mi) from the system management area 25 (S125), and performs signature verification using the second hash value H2(m0:mi) and the first public key (S126).

When the signature verification is successful (S130), the CPU 22 transmits a notification of validity indicating that the trace logs m0 to mi have not been altered to the host 3 (S132), and ends the series of processing illustrated in FIG. 3. When the signature verification is successful, the CPU 22 does not restrict access to the main storage 21 from the outside. That is, when the signature verification is successful, the CPU 22 allows data to be written from the outside to the main storage 21.

When the signature verification fails (S134), the CPU 22 transmits a notification of invalidity indicating that the trace logs m0 to mi have been altered to the host 3 (S136), and ends the series of processing illustrated in FIG. 3. When the signature verification fails, the CPU 22 restricts access to the main storage 21 from the outside. That is, when the signature verification fails, the CPU 22 prohibits writing data from the outside to the main storage 21.

According to the first embodiment, whether the trace log has been altered can be detected. According to the first embodiment, when the trace log has been altered, the fact that the trace log is invalid can be notified to the outside. Furthermore, according to the first embodiment, data stored in the main storage can be protected.

Second Embodiment

The configuration of an information processing system 1 according to the second embodiment is the same as the configuration illustrated in FIG. 1.

Figure 4:
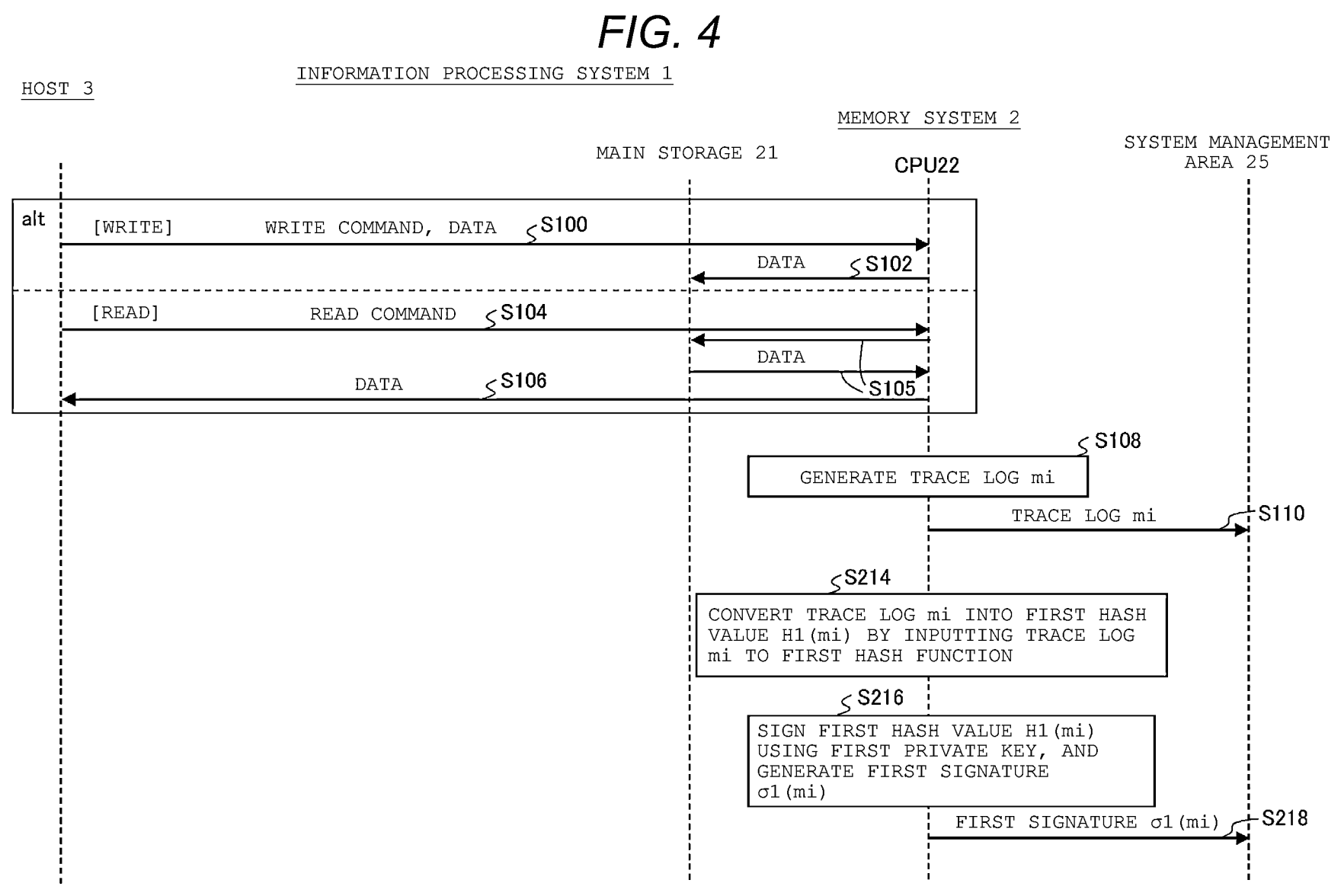

FIG. 4 is a sequence diagram illustrating an example of signature processing of the trace log according to the second embodiment.

The processing from S100 to S110 in FIG. 4 is the same as the processing from S100 to S110 in FIG. 2.

The CPU 22 converts the trace log mi into a first hash value H1(mi) for each trace log mi by inputting the trace log mi into the first hash function (S214). For each trace log mi, the CPU 22 signs the first hash value H1(mi) using the first private key, and generate a first signature σ1(mi) (S216). The CPU 22 stores the encrypted first signature σ1(mi) in the system management area 25 (S218), and ends the series of processing illustrated in FIG. 4.

The CPU 22 stores the first signature in the system management area 25 every time the trace log is generated. Therefore, the system management area 25 stores the first signature for each trace log. That is, the system management area 25 stores first signatures σ1(m0) to σ1(mi) that respectively correspond to the trace logs m0 to mi.

Figure 5:
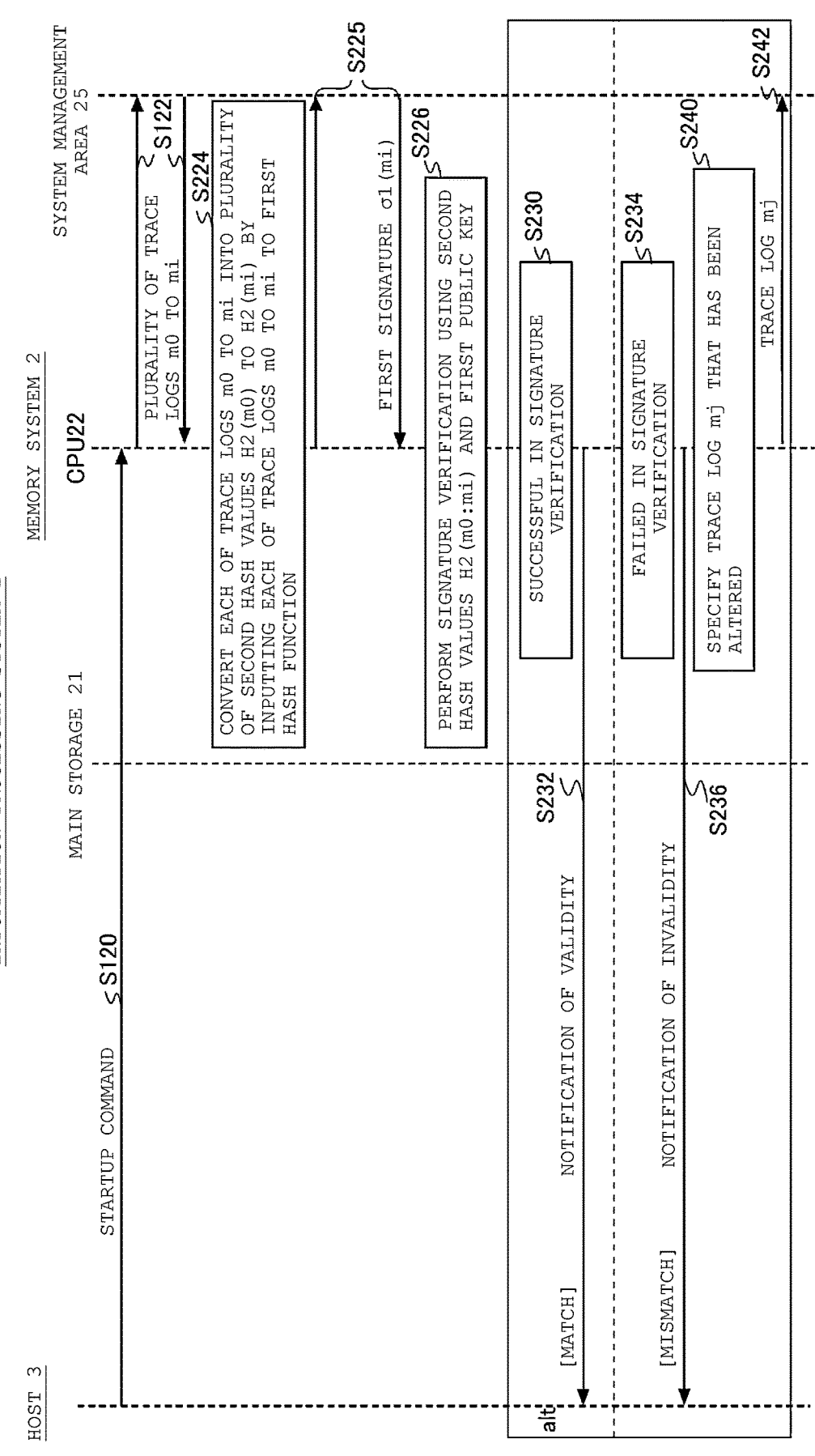
FIG. 5 is a sequence diagram illustrating an example of verification processing of the trace log according to the second embodiment.

FIG. 5 is a sequence diagram illustrating an example of verification processing of the trace log according to the second embodiment.

The processing of S120 and S122 in FIG. 5 is the same as the processing of S120 and S122 in FIG. 3.

The CPU 22 converts each of the trace logs m0 to mi into a plurality of second hash values H2(m0) to H2(mi) by inputting each of the read trace logs m0 to mi to the first hash function (S224). The CPU 22 reads the first signatures σ1(m0) to σ1(mi) (S225), and perform signature verification on each of the first signatures σ1(m0) to σ1(mi) using the second hash values H2(m0) to H2(mi) and the first public key (S226). That is, the CPU 22 executes signature verification for each trace log.

When the signature verification is successful (S230), the CPU 22 transmits a notification of validity indicating that the trace logs m0 to mi have not been altered to the host 3 (S232), and ends the series of processing illustrated in FIG. 5.

When the signature verification fails (S234), the CPU 22 transmits a notification of invalidity indicating that the trace logs m0 to mi have been altered to the host 3 (S236).

The CPU 22 specifies a trace log mj (j=0 to i) that has failed in signature verification, that is, has been altered, among the trace logs m0 to mi (S240).

The CPU 22 stores the trace log mj in the system management area 25 (S242), and ends the series of processing illustrated in FIG. 5.

According to the second embodiment, when the trace log has been altered, the fact that the trace log is invalid can be notified to the outside. According to the second embodiment, data stored in the main storage can be protected.

Furthermore, according to the second embodiment, by referring to the data stored in the system management area 25, the altered trace log can be known.

Third Embodiment

The configuration of an information processing system 1 according to the third embodiment is the same as the configuration illustrated in FIG. 1.

Figure 6:
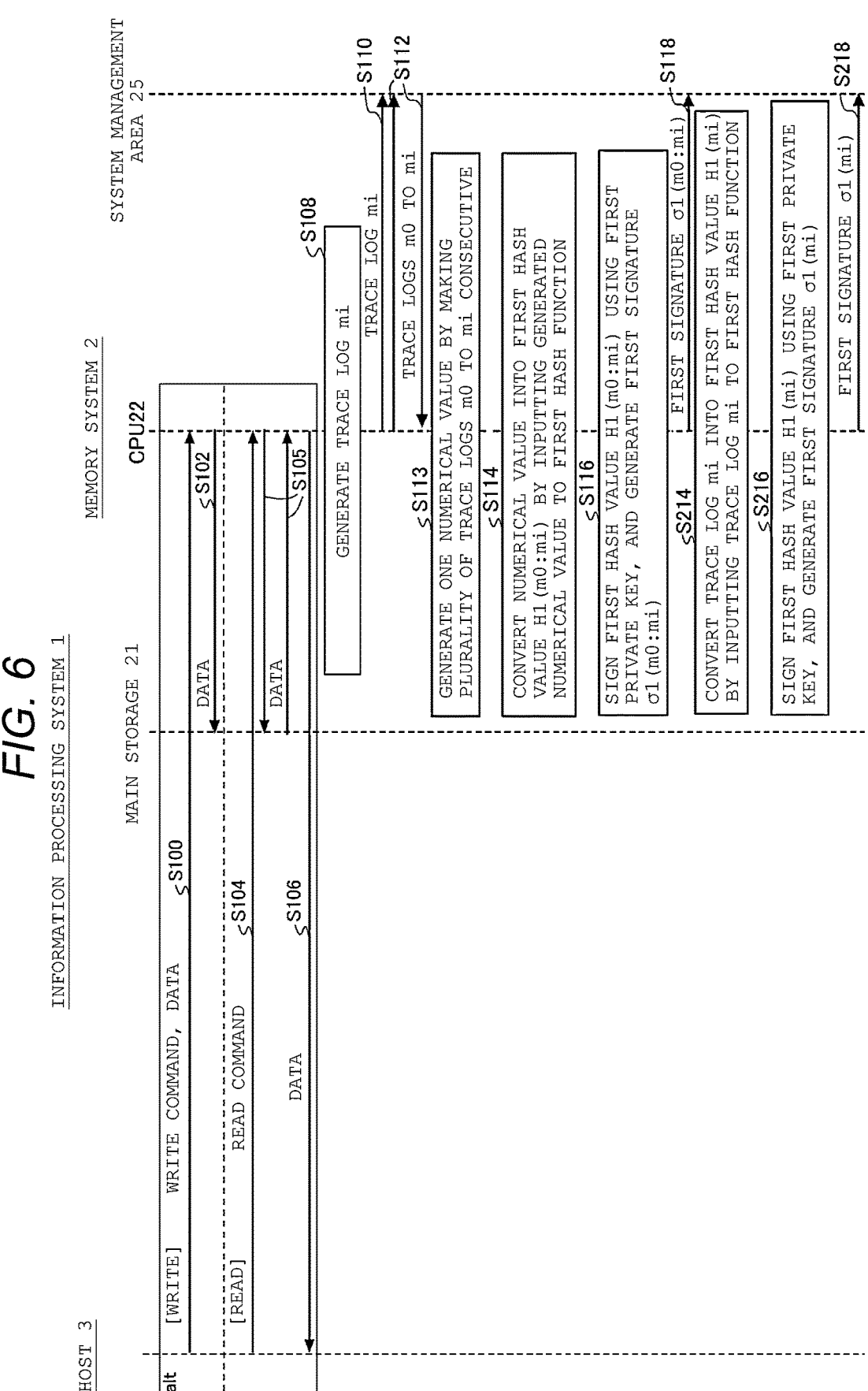
FIG. 6 is a sequence diagram illustrating an example of signature processing of a trace log according to a third embodiment.

FIG. 6 is a sequence diagram illustrating an example of signature processing of the trace log according to the third embodiment. The third embodiment is an embodiment combining the first embodiment and the second embodiment.

The processing from S100 to S110 in FIG. 6 is the same as the processing from S100 to S110 in FIG. 2.

The CPU 22 reads the plurality of trace logs m0 to mi stored in the system management area 25 (S112).

The CPU 22 generates one numerical value (first value) by making the plurality of read trace logs m0 to mi consecutive (S113). The CPU 22 converts the first value into the first hash value H1(m0:mi) by inputting the generated first value into the first hash function (S114).

The CPU 22 signs the first hash value H1(m0:mi) using the first private key, and generates the first signature σ1(m0: mi) (S116).

The CPU 22 stores the first signature σ1(m0:mi) in the system management area 25 (S118).

The CPU 22 converts the trace log mi into the first hash value H1(mi) by inputting the read trace log mi to the first hash function (S214).

The CPU 22 signs the first hash value H1(mi) using the first private key, and generates the first signature σ1(mi) (S216).

The CPU 22 stores the first signature σ1(mi) in the system management area 25 (S218), and ends the series of processing illustrated in FIG. 6.

The CPU 22 stores the first signature in the system management area 25 every time the trace log is generated.

Therefore, in the system management area 25, the first signature σ1(m0:mi) and the first signatures σ1(m0) to σ1(mi) that respectively correspond to the trace logs m0 to mi are stored.

Figure 7:
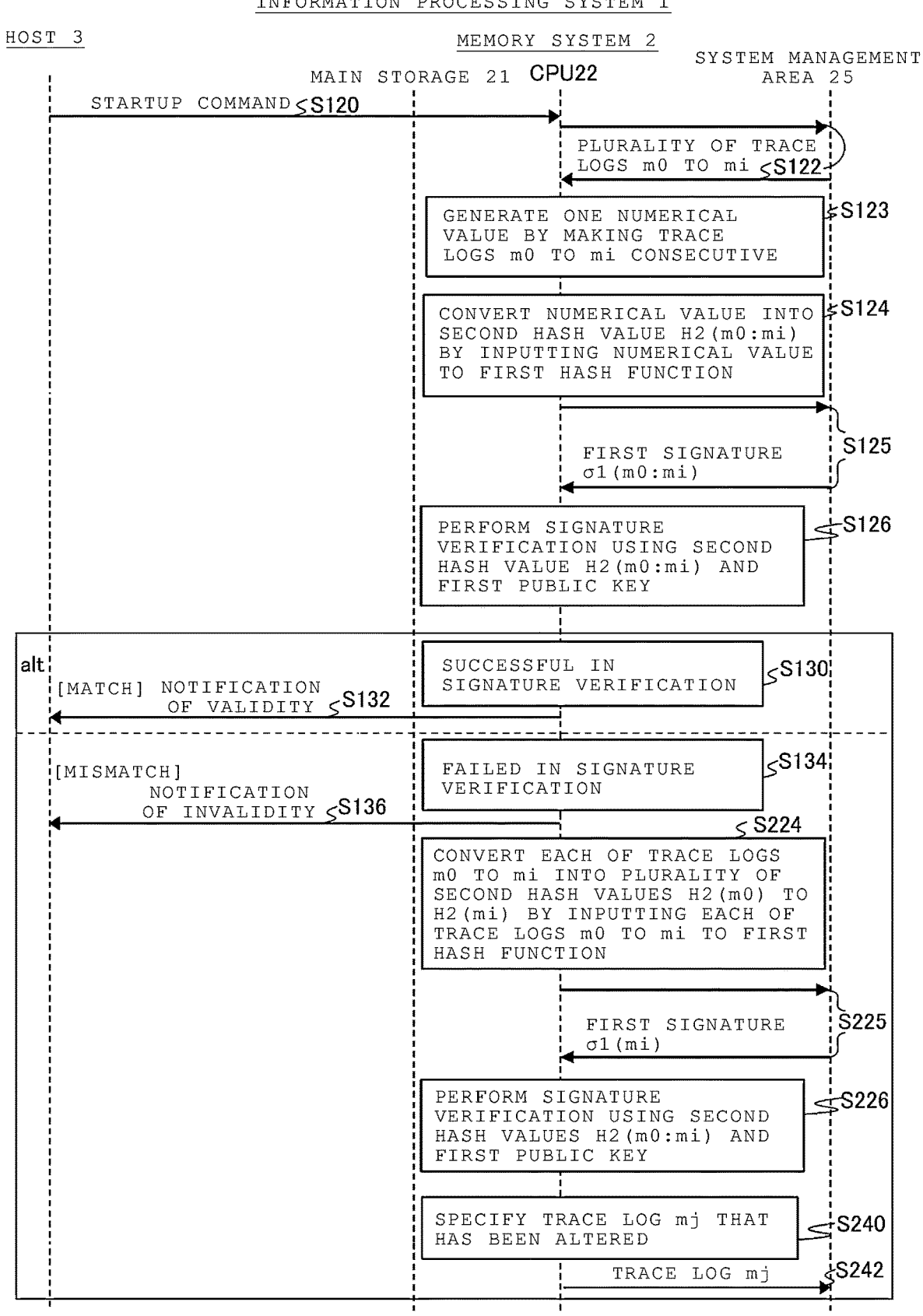
FIG. 7 is a sequence diagram illustrating an example of verification processing of the trace log according to the third embodiment.

FIG. 7 is a sequence diagram illustrating an example of verification processing of the trace log according to the third embodiment.

The processing from S120 to S136 in FIG. 7 is the same as the processing from S120 to S136 in FIG. 3.

When the signature verification fails in S134, the CPU 22 further executes the processing of S224 to S226, S240, and S242, and the series of processing in FIG. 7 ends.

According to the third embodiment, alteration of the trace logs m0 to mi can be detected in a shorter time than comparing the first signatures σ1(m0) to σ1(mi) with the second signatures σ2(m0) to σ2(mi), respectively.

According to the third embodiment, the CPU 22 can specify the altered trace log mj corresponding to the first signature σ1(mj).

Fourth Embodiment

The configuration of an information processing system 1 according to a fourth embodiment is the same as the configuration illustrated in FIG. 1.

Figure 8:
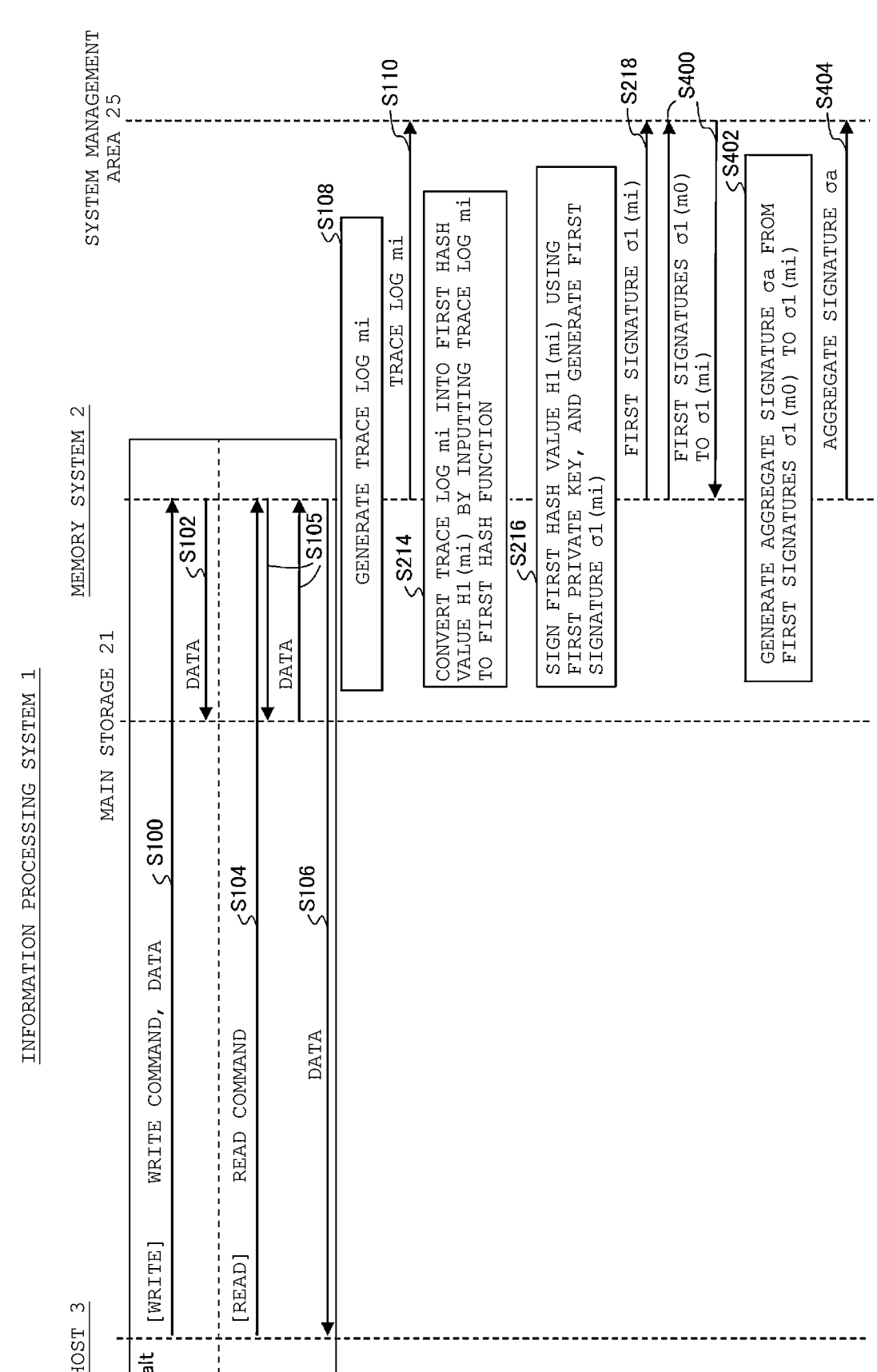
FIG. 8 is a sequence diagram illustrating an example of signature processing of a trace log according to a fourth embodiment.

FIG. 8 is a sequence diagram illustrating an example of signature processing of the trace log according to the fourth embodiment.

The processing of S100 to S110 and S214 to S218 in FIG. 8 is the same as the processing of S100 to S110 and S214 to S218 in FIG. 4.

The CPU 22 reads the first signatures σ1(m0) to σ1(mi) from the system management area 25 (S400).

The CPU 22 generates an aggregate signature σa, for example, by adding the first signatures σ1(m0) to σ1(mi) using the Dan Boneh, Craig Gentry, Ben Lynn, Hovav Shacham (BGLS) signature (S402).

The CPU 22 stores the aggregate signature σa in the system management area 25 (S404), and the series of processing illustrated in FIG. 8 ends.

Figure 9:
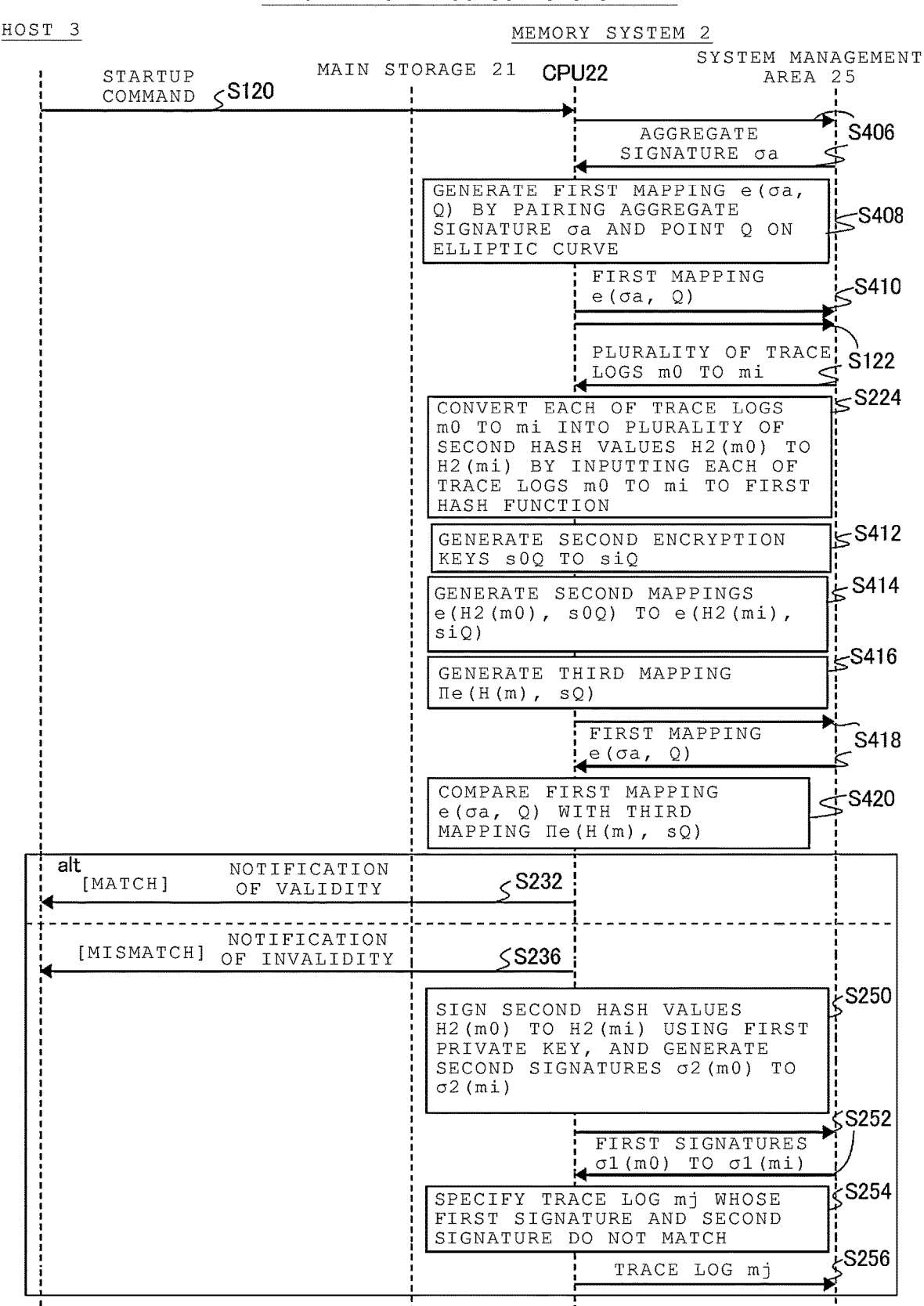
FIG. 9 is a sequence diagram illustrating an example of verification processing of the trace log according to the fourth embodiment.

FIG. 9 is a sequence diagram illustrating an example of verification processing of the trace log according to the fourth embodiment.

The processing of S120 in FIG. 9 is the same as the processing of S120 in FIG. 3.

The CPU 22 reads the aggregate signature σa from the system management area 25 (S406).

The CPU 22 generates a first mapping e(σa, Q) by pairing the aggregate signature σa and a point Q on an elliptic curve (S408).

The CPU 22 stores the generated first mapping e(σa, Q) in the system management area 25 (S410).

The processing of S122 and S224 in FIG. 9 is the same as the processing of S122 and S224 in FIG. 5.

The CPU 22 generates second encryption keys s0Q to siQ by multiplying each of first encryption keys s0 to si by the point Q (S412). The second encryption key is the result of multiplying the pair of the first private key and first public key of each of the first encryption keys so to si by the point Q.

The CPU 22 generates a plurality of second mappings e(H2(m0), s0Q) to e(H2(mi), siQ) by pairing the second hash values H2(m0) to H2(mi) and the second encryption keys s0Q to siQ, respectively (S414).

The CPU 22 generates a third mapping πe(H (m), sQ) by multiplying the plurality of generated second mappings e(H2(m0), s0Q) to e(H2(mi), siQ) (S416).

The CPU 22 reads the first mapping e(σa, Q) from the system management area 25 (S418). The CPU 22 compares the read first mapping e(σa, Q) with the generated third mapping πe(H(m), sQ) (S420).

When the first mapping e(σa, Q) and the third mapping πe(H(m), sQ) match ([match]), the CPU 22 executes S232, and the series of processing illustrated in FIG. 9 ends.

When the first mapping e(σa, Q) and the third mapping πe(H(m), sQ) do not match ([mismatch]), the CPU 22 executes S236.

When S236 is executed, the CPU 22 signs the second hash values H2(m0) to H2(mi) generated in S224 using the first private key, and generates second signatures σ2(m0) to σ2(mi) (S250).

The CPU 22 reads the first signatures σ1(m0) to σ1(mi) from the system management area 25 (S252).

The CPU 22 compares the read first signatures σ1(m0) to σ1(mi) with the second signatures σ2(m0) to σ2(mi), respectively, and specifies the trace log mj whose first signature and second signature do not match among the trace logs m0 to mi (S254).

The CPU 22 stores the specified trace log mj in the system management area 25 (S256), and the series of processing illustrated in FIG. 9 ends.

According to the fourth embodiment, the altered trace log mj corresponding to the first signature σ1(mj) can be specified.

The embodiments are illustrative, and the scope of the disclosure is not limited thereto.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:

a first storage;

a second storage storing log information indicating a history of accesses to the first storage;

a third storage storing a first private key and a first public key; and a processor configured to convert the log information into a first hash value by inputting the log information to a hash function, sign the first hash value using a first private key, generate a first signature, and generate an aggregate signature by adding a plurality of the first signatures corresponding to a plurality of pieces of the log information, respectively, wherein the processor is further configured to:

generate a first mapping by pairing the aggregate signature and a first point on an elliptic curve;

convert the plurality of pieces of log information into a plurality of second hash values, respectively, by inputting the plurality of pieces of log information to the hash function;

generate a second mapping by pairing a second encryption key obtained by using a first encryption key and the first point on the elliptic curve with the plurality of second hash values;

generate a third mapping by multiplying a plurality of the second mappings corresponding to the plurality of pieces of log information, respectively; and compare the first mapping with the third mapping.

2. The memory system according to claim 1, wherein the processor is further configured to:

transmit a first signal indicating that the log information has not been altered when the first mapping and the third mapping are equal; and transmit a second signal indicating that the log information has been altered when the first mapping and the third mapping are different.

\* \* \* \* \*